UNITED STATES PATENT OFFICE.

HEINRICH EICHWEDE, OF HÖCHST-ON-THE-MAIN, GERMANY, ASSIGNOR TO FARB-WERKE VORM. MEISTER LUCIUS & BRÜNING, OF HÖCHST-ON-THE-MAIN, GERMANY, A CORPORATION OF GERMANY.

PROCESS OF PRODUCING DYEINGS ON COTTON.

1,123,263.   Specification of Letters Patent.   Patented Jan. 5, 1915.

No Drawing.   Application filed April 8, 1913. Serial No. 759,654.

*To all whom it may concern:*

Be it known that I, HEINRICH EICHWEDE, Ph. D., chemist, a citizen of the Empire of Germany, residing at Höchst-on-the-Main, Germany, have invented certain new and useful Improvements in the Process of Producing Dyeings on Cotton, of which the following is a specification.

I have found that dyeings of great value are obtained by developing on the cotton fiber by means of nitranilin a dyestuff produced by combining a tetrazotized diamin with two coupling components of which at least one is an aryl-pyrazolone amidated in the aryl residue. Under the term "amidated aryl-pyrazolones" we comprise both the amino-aryl-pyrazolone and its sulfonic or carboxylic acids.

The dyestuffs in question are prepared by causing the tetrazotized diamin to act upon 2 molecular proportions of an amino-aryl-pyrazolone or of one of its sulfonic or carboxylic acids, or by combining the intermediate product, obtained from one molecular proportion of an amino-aryl-pyrazolone, or one of its sulfonic or carboxylic acids, with any other azo dyestuff component. When using in this operation a substance which is combined with difficulty, for instance, salicylic acid, it may be advantageous to couple the substance as the first step and then to couple the amino-aryl-pyrazolone. When unsymmetrical diamins are used, for example a benzidin-monosulfonic acid, dyeings are obtained which vary in color according to the order in which the coupling is effected. In the place of an amino-aryl-pyrazolone there may be used a corresponding nitro- or acylamino-aryl-pyrazolone, and the dyestuff thus obtained may be subsequently reduced, or, when using acyl derivatives, saponified; the qualities of the dyeings are not affected thereby.

The tints of the dyeings obtainable by my new process vary, according to the diazotized diamins and according to the coupling components used, from yellow to brown and orange, and they are remarkable for their excellent fastness and for their property of being easily discharged.

The following examples illustrate my invention, the parts being by weight.

Example I: 20.2 parts of 2.6-totuylene-diamin-4-sulfonic acid are tetrazotized by means of 13.8 parts of sodium nitrite in presence of diluted hydrochloric acid. The tetrazotized liquid is run into a solution alkaline with sodium carbonate of 37.8 parts of 1-(p-aminophenyl)-3-methyl-5-pyrazolone. The dyestuff thus obtained in a viscous condition is gently heated in presence of common salt and isolated. When dry, it forms a reddish-brown powder dyeing cotton a yellow tint. Cotton dyed with three per cent. of this dyestuff is treated for half an hour in a bath containing 2 grams of diazotized p-nitranilin and 1 gram of sodium acetate per liter, then rinsed and dried; thus yellow dyeings of great fastness to washing and capable of being easily discharged are obtained.

Example II: 37 parts of 4-4$^1$-diaminostilbene-2.2$^1$-disulfonic acid are tetrazotized and combined, as described in Example I, with 37.8 parts of 1-(p-aminophenyl)-3-methyl-5-pyrazolone in a solution alkaline with sodium carbonate. The brownish-red dyestuff thus obtained is then gently heated and salted out; it dyes cotton a reddish-yellow tint, which, when developed by means of diazotized para-nitranilin in the manner indicated in Example I, becomes bright orange.

Example III: 26.4 parts of benzidinmonosulfonic acid are tetrazotized and the acid tetrazo-solution is neutralized by means of sodium carbonate. Into this solution is run a solution of 16 parts of sodium salicylate and about an equivalent of sodium carbonate. As soon as the formation of the intermediate product is finished, the mixture, or, if required, the product separated by filtration and again mixed with water, is run into a solution alkaline with sodium carbonate of 18.9 parts of 1-(p-aminophenyl)-3-methyl-5-pyrazolone. The dyestuff thus obtained forms a reddish-brown powder and, when dyed on cotton and developed by means of diazotized para-nitranilin in the manner indicated in Example I, it yields a clear orange-yellow tint.

Example IV: 26.4 parts of benzidinmonosulfonic acid are tetrazotized, 15.3 parts of 4-nitro-1:3-phenylenediamin, dissolved in hydrochloric acid, are added thereto, and into this mixture is slowly run drop by drop a diluted solution of sodium carbonate until the acid reaction has disappeared and the formation of the dyestuff is terminated. The reddish-brown intermediate product, which separates, is filtered off, and after having mixed it with water, it is combined with 18.9 parts of 1-(p-aminophenyl)-3-methyl-5-pyrazolone in a solution rendered alkaline by means of sodium carbonate. The dyestuff dissolves somewhat difficultly in water; when dyed on cotton and treated with diazotized meta-nitranilin, in the manner indicated in Example I, it develops, yielding a bright orange tint.

Example V: 26.4 parts of benzidinmonosulfonic acid are tetrazotized and combined with 18.9 parts of 1-(p-aminophenyl)-3-methyl-5-pyrazolone. Thus an intermediate product is obtained which is slowly run into a solution alkaline with sodium carbonate of the dyestuff produced from sulfanilic acid (diazotized) and m-phenylenediamin; the dyestuff, which is first of a viscous consistence, can be isolated in the form of crystals having a metallic luster on addition of a small quantity of common salt. When fixed on cotton and developed by means of diazotized ortho-nitranilin in the manner indicated in Example I, it yields a deep brown tint of excellent fastness.

Having now described my invention, what I claim, is:

The process of producing on cotton dyeings capable of being discharged, which consists in developing on the fiber by means of diazotized nitranilin a dyestuff obtainable by combining a tetrazotized diamin with two coupling-components of which at least one is an aryl-pyrazolone amidated in the aryl-residue.

In testimony whereof, I affix my signature in presence of two witnesses.

HEINRICH EICHWEDE.

Witnesses:
JEAN GRUND,
CARL GRUND.

Copies of this patent may be obtained for five cents each, by addressing the "Commissioner of Patents, Washington, D. C."